(12) United States Patent
Johnson et al.

(10) Patent No.: US 9,914,646 B2
(45) Date of Patent: Mar. 13, 2018

(54) METHOD FOR THE PROCESSING OF POTASSIUM CONTAINING MATERIALS

(71) Applicant: K-Max Pty Ltd, Belmont, Western Australia (AU)

(72) Inventors: Gary Donald Johnson, Belmont (AU); Mark Daniel Urbani, Wattle Grove (AU); Nicholas John Vines, High Wycombe (AU)

(73) Assignee: K-Max Pty Ltd., Belmont (AU)

( * ) Notice: Subject to any disclaimer, the term of this patent is extended or adjusted under 35 U.S.C. 154(b) by 0 days.

(21) Appl. No.: 15/527,512

(22) PCT Filed: Nov. 16, 2015

(86) PCT No.: PCT/AU2015/000691
§ 371 (c)(1),
(2) Date: May 17, 2017

(87) PCT Pub. No.: WO2016/077864
PCT Pub. Date: May 26, 2016

(65) Prior Publication Data
US 2017/0320749 A1      Nov. 9, 2017

(30) Foreign Application Priority Data

Nov. 17, 2014   (AU) .................. 2014904601

(51) Int. Cl.
*C01D 5/00*   (2006.01)
*C01D 5/02*   (2006.01)
(Continued)

(52) U.S. Cl.
CPC .............. *C01D 5/02* (2013.01); *C01B 17/501* (2013.01); *C01B 25/26* (2013.01); *C01F 5/40* (2013.01);
(Continued)

(58) Field of Classification Search
CPC .. C01D 5/02; C01G 49/04–49/08; C01F 5/40; C01B 25/26–25/34; C22B 3/08; C22B 3/22
(Continued)

(56) References Cited

U.S. PATENT DOCUMENTS

| | | | | |
|---|---|---|---|---|
| 1,182,668 A | * | 5/1916 | Firebaugh | C01D 5/00 23/296 |
| 1,415,346 A | * | 5/1922 | Hayward | C01F 7/762 423/117 |

(Continued)

OTHER PUBLICATIONS

International Search Report and Written Opinion of the ISA, ISA/AU, Woden ACT, dated Jan. 18, 2016.

*Primary Examiner* — Steven Bos
(74) *Attorney, Agent, or Firm* — Harness, Dickey & Pierce, P.L.C.

(57) ABSTRACT

A method for the processing of potassium containing materials comprises:
(i) Separation of a potassium containing mineral from gangue minerals;
(ii) Acid leaching whereby substantially all potassium, iron, aluminum and magnesium is solubilized and mixed potassium/iron double salt formed;
(iii) Selectively crystallizing the mixed potassium/iron double salt formed in the leach step (ii);
(iv) Second separation to separate the mixed potassium/iron double salt formed in step (iii);
(v) Thermal decomposition to produce an iron oxide, a potassium salt and one or more phosphates;
(vi) Leaching the product of the thermal decomposition;
(vii) Third separation to separate the iron oxide and phosphate from the potassium salt;
(viii) Recovering the potassium salt by crystallization;
(ix) Separating the iron oxide and phosphate of step (vii) by leaching and subsequent solid liquid separation; and
(Continued)

(x) Precipitating phosphate from liquor produced in step (ix) through the addition of a base.

21 Claims, 1 Drawing Sheet

(51) Int. Cl.
    *C01F 7/74*          (2006.01)
    *C01B 17/50*        (2006.01)
    *C01B 25/26*        (2006.01)
    *C01F 5/40*          (2006.01)
    *C01G 49/04*        (2006.01)
    *C01G 49/08*        (2006.01)

(52) U.S. Cl.
    CPC .............. *C01F 7/741* (2013.01); *C01G 49/04* (2013.01); *C01G 49/08* (2013.01)

(58) Field of Classification Search
    USPC ....... 423/146, 150.1, 132, 157.4, 157.5, 166
    See application file for complete search history.

(56) References Cited

U.S. PATENT DOCUMENTS

| | | |
|---|---|---|
| 1,737,263 A | 11/1929 | Moxham |
| 1,742,191 A | 1/1930 | Arnold |
| 1,748,989 A | 3/1930 | Moxham |
| 1,843,779 A | 2/1932 | McWhorter, Jr. |
| 2,488,604 A * | 11/1949 | Pike .................... C01B 25/003 423/157.5 |
| 2016/0257574 A1* | 9/2016 | Lehmkuhl ............... C05B 11/06 |

* cited by examiner

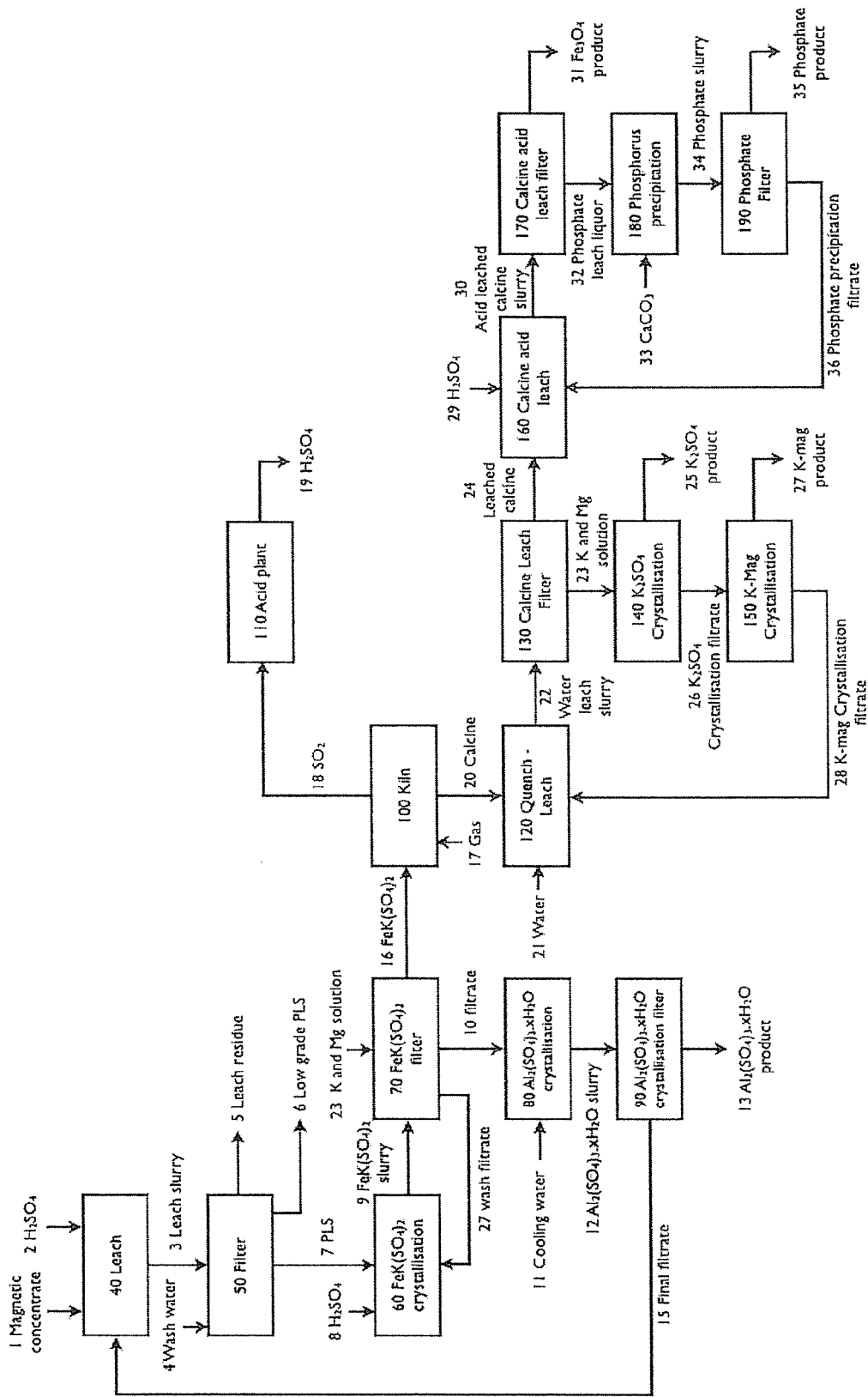

METHOD FOR THE PROCESSING OF POTASSIUM CONTAINING MATERIALS

CROSS-REFERENCE TO RELATED APPLICATIONS

This application is a 371 U.S. National Stage of International Application No. PCT/AU2015/000691, filed Nov. 16, 2015, and published in English as WO 2016/077864 A1 on May 26, 2016, which claims the benefit of and priority to Australian Patent Application No. 2014904601, filed Nov. 17, 2014. The entire disclosures of the above applications are incorporated herein by reference.

FIELD OF THE INVENTION

The present invention relates to a method for the processing of potassium containing materials. More particularly, the method of the present invention is intended for use in the recovery of at least potassium as a saleable product from potassium rich minerals including, but not limited to, glauconitic greensand. The method of the present invention may further recover one or more of iron, magnesium and aluminium from those same minerals.

BACKGROUND ART

The major sources of commercially mined potash have historically come from large sylvite mineral deposits. To date there has been no commercial production of potash fertilisers from glauconite rich deposits. Potassium rich glauconite deposits appear abundant and several efforts have been directed to the production of potash from these resources. Due to a variety of circumstances, each attempt has been commercially unsuccessful. Several authors have reported glauconite to be readily leached in mineral acids, resulting in the extraction of metals present in glauconite to solution. Whilst there have been several flow sheets for the recovery of potassium from these leach liquors proposed, all have proven commercially un-economic.

By way of example, the Moxham process (see the *Annual Survey of American Chemistry*, Vol. 1, Ed. Hale, W. J., Published for National Research Council by The Chemical Catalogue Company, Inc. N.Y., 1927, pages 85 and 86) involves the hot digestion of greensand in 40-50% sulfuric acid, which dissolves >90% of the potassium, iron, aluminium and magnesium present. The metal sulfates are crystallised by evaporation and/or the addition of concentrated sulfuric acid, and are then thermally decomposed (500° C.) forming $Fe_2O_3$ and $SO_3$ for sulfuric acid production. Following water leaching of the calcine, the $Fe_2O_3$ is separated from the dissolved $K_2SO_4$ and $Al_2(SO_4)_3$ and K-alum $(KAl(SO_4)_2.12H_2O)$ is crystallised. The K-alum is roasted at 900° C. to produce $K_2SO_4$, $Al_2O_3$ and $SO_2$ for sulfuric acid recovery. Following water leaching of the calcine, the insoluble $Al_2O_3$ is separated and $K_2SO_4$ crystallised from solution. This process suffered in particular from high energy costs as a result of the K-alum calcination stage.

Further, the McWhorter process (see for example U.S. Pat. No. 1,843,779) describes the leaching of greensand with excess sulfuric acid, diluted sufficiently to prevent the crystallisation of salts during leaching. High metal extractions can be obtained and the liquor is separated from the silicon rich residue by decantation. The greater part of the iron is present in the ferric form. The crystallisation of $FeSO_4.H_2O$ is forced by the reduction of iron using a reducing agent such as iron metal. The solubility of $FeSO_4$ decreases above 65° C. so the crystallisation of $FeSO_4.H_2O$ is conducted at close to the boiling point of the solution. The $FeSO_4.H_2O$ is separated from the liquor in which K-alum crystallises on cooling. The K-alum is re-crystallised to remove entrained iron. $FeSO_4.H_2O$ is thermally decomposed (500° C.) forming $Fe_2O_3$ and $SO_2$ for sulfuric acid production. The recovery of $K_2SO_4$ from K-alum results in a similar fate to that of the Moxham process described above as it requires an expensive calcination step to convert K-alum to $K_2SO_4$, $Al_2O_3$ and $SO_3$.

The method of the present invention has as one object thereof to overcome substantially the abovementioned problems of the prior art, or to at least provide a useful alternative thereto.

The preceding discussion of the background art is intended to facilitate an understanding of the present invention only. It should be appreciated that the discussion is not an acknowledgement or admission that any of the material referred to formed part of common general knowledge as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a method for the processing of potassium containing materials, the method comprising the steps of:
(i) Passing a potassium containing material to a first separation step in which a potassium containing mineral is separated from gangue minerals present;
(ii) Leaching the potassium containing mineral in acid whereby substantially all potassium, iron, aluminium and magnesium present is solubilised and a mixed potassium/iron double salt formed;
(iii) Selectively crystallising the mixed potassium/iron double salt formed in the leach of step (ii) in a crystallising step;
(iv) Passing a liquor from the crystallising step (iii) to a second separation step to separate the mixed potassium/iron double salt formed in step (iii);
(v) Passing the double salt to a thermal decomposition step to produce an iron oxide, a potassium salt and one or more phosphates;
(vi) Leaching the product of the thermal decomposition step;
(vii) Passing a leach liquor from step (vi) to a third separation step to separate the iron oxide and phosphates from the potassium salt;
(viii) Recovering the potassium salt by crystallisation;
(ix) Separating the iron oxide and phosphate of step (vii) by leaching and subsequent solid liquid separation; and
(x) Precipitating phosphate from a liquor produced in step (ix) through the addition of a base thereto.

Preferably, potassium containing mineral comprises one or more of glauconite, biotite and/or phlogopite.

The iron oxide separated in step (ix) is preferably in the form of one or more of $Fe_3O_4$, $Fe_2O_3$ or $FeO$.

Still preferably, the leaching step (ii) is conducted under atmospheric conditions at a temperature close to boiling. Further, the leaching step is carried out with an excess of sulfuric acid allowing for a free acid concentration of >50 g/L $H_2SO_4$.

Still further preferably, the total sulfate concentration is such that it is close to the saturation limit of the solution at the leaching temperature. In one form of the invention the total sulfate concentration is 6.0 M S at >90° C.

Preferably, the leaching step (ii) has a retention time of between about 2 to 24 hours. Still preferably, the retention time is between about 2 to 12 hours.

Preferably, a metal extraction of greater than 70% is achieved during the leaching step (ii). Still preferably, a metal extraction of greater than 90% is achieved.

The separation of leach liquor from leached solids is preferably conducted at or near the leach temperature to prevent the crystallisation of metal salts on cooling.

Preferably, the selective crystallisation step (iii) is conducted at or close to the leaching temperature and forced by increasing the sulphur concentration to above saturation. In one form of the invention the sulphur concentration is >6 M sulphur at >90° C. Further, the increased sulphur concentration may be achieved by the addition of concentrated sulfuric acid and/or evaporation. Still preferably, $KFe(SO_4)_2$, $MgSO_4$ and phosphate salts are crystallised in the crystallisation step (iii).

Preferably, the $KFe(SO_4)_2$ may be washed to remove entrained impurities, such as $Al_2(SO_4)_3$, with a saturated solution of $K_2SO_4$, K and Mg sulfates, $K_2SO_4/Fe_2(SO_4)_3$, $H_2SO_4$ or water. The wash solution may be recycled to the $KFe(SO_4)_2$ crystallisation stage. The wash filtrate is preferably recycled to the $KFe(SO_4)_2$ crystallisation stage in which the K/Fe ratio in the liquor will increase and result in a higher iron recovery if the wash liquor contains a high K/Fe ratio. The amount of recycled $K_2SO_4$ can be controlled to target a specific Fe recovery.

Still preferably, the crystallisation step (iv) may be achieved by forced cooling of the mixed $KFe(SO_4)_2$, $MgSO_4$ and phosphate crystallisation filtrate to between about 20 to 60° C., for example to about 60° C. The reduction in temperature from that of the $KFe(SO_4)_2$ crystallisation stage initiates $Al_2(SO_4)_3$ crystallisation. The crystals may be recovered by filtration and washed with water or a solution containing $Al_2(SO_4)_3$. The $Al_2(SO_4)_3$ is dried and stored for sale as $Al_2(SO_4)_3$ with varying degree of hydration. In this manner an expensive K-alum decomposition stage is avoided.

Preferably, the thermal decomposition stage (v) should be operated in the temperature range of about 450-800° C. Any $SO_2$ produced is preferably collected for conversion into sulfuric acid.

Still preferably the thermal decomposition stage is operated at about 500-700° C. to substantially prevent the conversion, if present, of $MgSO_4$ to MgO.

The decomposition product is preferably quenched with water to dissolve $K_2SO_4$ and $MgSO_4$. It is preferable to use an amount of water appropriate to ensure $K_2SO_4$ and $MgSO_4$ are close to saturation at a temperature close to boiling.

After solid liquid separation, the crystallisation of $K_2SO_4$ and/or mixed K and Mg double salts from solution may be achieved by a combination of cooling and forced evaporation.

Preferably, the conditions are controlled to crystallise $K_2SO_4$ selectively in a primary crystallisation stage and a mixed K and Mg double salt is crystallised from the primary crystallisation filtrate in a secondary crystallisation stage. The K and Mg containing salts are dried and stored for sale.

Preferably, the precipitation step (viii) is conducted by the addition of a relatively cheap base such as lime or limestone. Upon addition of the base the pH is preferably between about 3 and 7. Still preferably, the resulting precipitate is generally similar in composition to commercial grade single superphosphate.

Still preferably, the precipitation can be forced by the addition of apatite, recovered from greensand, thereby producing a precipitate containing a higher concentration of phosphorus than commercial grade single super phosphate.

In one form, the method for the processing of potassium containing materials is directed to the recovery of a potassium containing salt, not limited to but preferably $K_2SO_4$, and/or a potassium and magnesium containing double salt, iron oxide, as preferably $Fe_3O_4$ but potentially $Fe_2O_3$ or FeO, and aluminium as a salt or alumina, but preferably the semi-hydrated sulfate salt from glauconite containing greensands comprising the method steps of:

(i) Separation of the potassium containing mineral, glauconite, from gangue minerals, such as quartz and feldspar, by high intensity magnetic separation (ii) Leaching glauconite in sufficient sulfuric acid solution to enable the potassium, iron, aluminium and magnesium values to be converted to sulfates and at a concentration that prevents the crystallisation of these metals in the leaching stage. Phosphorous containing impurities, such as apatite and iron and aluminium containing phosphates are likely to be present as impurities. Phosphates are leached during this stage.

(iii) Selective crystallisation of the mixed K/Fe double salt, $KFe(SO_4)_2$ with varying degrees of hydration by salting out, which is not limited to but preferably the addition of concentrated sulfuric acid or evaporation. The addition of $K_2SO_4$ can be used to increase the recovery of iron if required. The conditions can be controlled to allow for some magnesium and phosphorous to be precipitated during this stage.

(iv) Separation of the $KFe(SO_4)_2$ and magnesium and phosphorous containing precipitate from the liquor by filtration or decantation then crystallising $Al_2(SO_4)_3$ with varying amounts of hydration by cooling with or without salting out and/or evaporation. Salting out is not limited to but preferably by the addition of sulfuric acid.

(v) Thermal decomposition of the potassium and iron containing double salts forming an oxide of iron, preferably $Fe_3O_4$, $K_2SO_4$, $MgSO_4$, phosphate and $SO_2$ for sulfuric acid production.

(vi) Water leaching of the calcine, followed by solid liquid separation to separate $Fe_3O_4$ and phosphate from $K_2SO_4$ and $MgSO_4$, which are recovered by crystallisation.

(vii) Acid leaching the water leached calcine, followed by solid liquid separation to separate from phosphate.

(viii) Precipitation of phosphate from the acidic liquor by the addition of a suitable base.

The method of the present invention comprises, in very general terms, a number of operating steps, each used to varying extents in mineral processing, and in hydrometallurgical and pyrometallurgical processes, albeit in combinations unlike that of the present invention. In one form, a potassium containing mineral such as the micas glauconite, biotite and phlogopite, is pre-concentrated by a mineral separation process, not limited to but preferably magnetic separation. The potassium, iron, magnesium and aluminium present in the potassium containing mica is extracted by strong sulfuric acid leaching and the metal sulfate salts are recovered by selective crystallisation. High temperature roasting followed by water leaching separates iron from magnesium and potassium, which are recovered as saleable iron oxide, potassium and magnesium sulfates. Phosphorus is removed from the iron product by acid leaching. Aluminium is recovered as a saleable aluminium sulfate product, or it is further treated to yield other aluminium chemicals. Sulfur dioxide from the roasting step is recycled to a sulfuric acid plant.

BRIEF DESCRIPTION OF THE DRAWINGS

The process of the present invention will now be described, by way of example only, with reference to one embodiment thereof and the accompanying drawings, in which:

FIG. 1 is a flow sheet depicting a process for the recovery of potassium, iron, magnesium and aluminium from glauconite rich magnetic concentrate by acid leach, $KFe(SO_4)_2$ crystallisation, $KFe(SO_4)_2$ decomposition, $Fe_3O_4$ recovery, $K_2SO_4$ and potassium and magnesium double salt crystallisation, and $Al_2(SO_4)_3$ crystallisation, in accordance with the present invention.

BEST MODE(S) FOR CARRYING OUT THE INVENTION

The method of the present invention is anticipated to be applicable to a broad range of potassium containing minerals, including potassium containing micas, of which glauconite, biotite and phlogopite are representative. Whilst the large part of this description is directed to glauconite alone it is to be understood that the method of the present invention is broadly applicable to potassium containing micas, with particular efficacy in respect of the minerals glauconite, biotite and phlogopite.

Glauconite is an iron potassium phyllosilicate (mica group) mineral of characteristic green color with very low weathering resistance and very friable. Its chemical formula is $(K,Na)(Fe^{3+},Al,Mg)_2(Si,Al)_4O_{10}(OH)_2$. Glauconite can range from 2-8% $K_2O$ and is the component in greensand that contributes to the green colour. Greensands also contain gangue minerals such as quartz, kaolinite, feldspar and apatite.

The glauconite in greensand can be separated from the gangue minerals by high intensity magnetic separation, due to its low magnetic susceptibility. Magnetic concentrate, which contains a high proportion of glauconite, is treated as shown in FIG. 1 and described hereinafter. The relative grades of the metals in glauconite are described by way of example only, and the method of the present invention is expected to treat any glauconite bearing material, not dependent on grade.

In FIG. 1 there is shown a method for the processing of potassium containing materials, specifically in the form of a flow sheet for the processing of glauconite containing magnetic concentrate 1 to recover potassium as $K_2SO_4$ 25 and potassium and magnesium as K-Mag 27, iron as $Fe_3O_4$ 31 and aluminium as $Al_2(SO_4)_3.xH_2O$ 13.

The glauconite containing magnetic concentrate 1 is passed to a leach step 40 in which at least a proportion of the contained potassium, iron, magnesium and aluminium are extracted into solution forming a pregnant leach solution ("PLS"). Sulfuric acid 2 and recycled final filtrate 15 are added to the leach step 40. The leach reactors employed in the leach step 40 are heated to provide high metal extractions and relatively short retention time, for example greater than 70% metal extraction in between 2 to 24 hours, more specifically greater than 90% metal extraction in up to 12 hours. The leach step 40 is conducted under atmospheric conditions at a temperature close to boiling. Further, the leaching step 40 is carried out with an excess of sulfuric acid allowing for a free acid concentration of >50 g/L $H_2SO_4$. The total sulfate concentration in the leach step 40 is such that it is close to the saturation limit of the solution at the leaching temperature. For example, the total sulfate concentration may be 6.0 M sulphur at >90° C. Under these conditions >90% metal extraction is achieved within 12 hours.

A leach discharge or slurry 3 is passed from the leach step 40 to a solid liquid separation step, for example a belt filter 50, which enables the leach discharge or slurry 3 to be filtered at or near the leaching temperature. The separation of leach liquor from leached solids is conducted at or near the leach temperature to prevent the crystallisation of metal salts on cooling.

The filtration stage produces a pregnant leach solution or PLS 7 containing the bulk of the extracted potassium, iron, magnesium and aluminium, and a leach residue 5. The leach residue 5 is washed with water 4 and/or an impurity bleed stream. A wash filtrate can be collected separately forming a low grade PLS 6, which can be used as make-up water where required.

The PLS 7 from the filter 50 is passed to the $KFe(SO_4)_2$ crystallisation stage 60. Sulfuric acid 8 is added to force the crystallisation of $KFe(SO_4)_2$. The crystallisation tanks are heated to maintain the temperature at or close to the leaching temperature. This is best controlled by indirect steam addition to prevent water from entering the crystallisation tanks. Further, the crystallisation forced by increasing the sulphur concentration to above saturation, for example a sulphur concentration of >6 M sulphur at >90° C. $MgSO_4$ and phosphate salts are also crystallised in the crystallisation stage 60.

$KFe(SO_4)_2$ crystallisation slurry 9 is passed through a solid liquid separation stage 70, for example a centrifuge, which enables the solids and liquid to be separated at or close to the temperature of the crystallisation stage. A filtrate 10 is passed to an $Al_2(SO_4)_3.xH_2O$ crystallisation stage 80 and the solids are washed with part of a potassium and magnesium solution 23, to be described hereinafter. Washed $KFe(SO_4)_2$ is stockpiled for further treatment.

A wash filtrate 27, which contains $K_2SO_4$ and entrained impurities including $Al_2(SO_4)_3$, is recycled to the $KFe(SO_4)_2$ crystallisation stage 60 to recover aluminium and increase the K/Fe ratio, which allows for a higher iron recovery. The amount of $K_2SO_4$ recycled can be controlled to target a specific iron recovery.

The filtrate 10, which contains mainly $Al_2(SO_4)_3$, is fed to the $Al_2(SO_4)_3.xH_2O$ crystallisation stage 80. In this stage the temperature of the solution is reduced by cooling and $Al_2(SO_4)_3.xH_2O$ crystallises. The cooling rate can be increased by indirect contact with cooling water 11. The crystallisation slurry 12 is passed to a solid liquid separation step, for example a belt filter. The filtration stage producers a final filtrate 15, which has a high concentration of $H_2SO_4$ and some soluble iron and aluminium, and solid $Al_2(SO_4)_3.xH_2O$ 13. The $Al_2(SO_4)_3.xH_2O$ can be washed with a saturated solution of $Al_2(SO_4)_3$ to remove impurities such as $H_2SO_4$ and iron. The wash filtrate can be combined with final filtrate 15 and then recycled to the leach stage 40. $Al_2(SO_4)_3.xH_2O$ can be dried and stored prior to sale, with varying degrees of hydration. In this manner an expensive K-alum decomposition stage is avoided.

The $KFe(SO_4)_2$ 16 is fed to a kiln 100 which operates between about 450° C. to 800° C., for example at >500° C., for thermal decomposition. This enables $KFe(SO_4)_2$ to be converted to $Fe_3O_4$, $K_2SO_4$ and $SO_2$ under slightly reducing conditions. $SO_2$ gas 18 is recovered and fed to an acid plant 110. Sulfuric acid 19 is produced and used at various stages in the method of the present invention. Operation of the kiln 100 between about 500° C. to 700° C. substantially prevents the conversion, if present, of $MgSO_4$ to MgO.

A calcine 20 is discharged from the kiln 100 and is quenched with water 21 in the quench tank and subsequent calcine leach tanks 120. $K_2SO_4$ and $MgSO_4$ dissolve in the water 21 and recycled K-mag crystallisation filtrate 28.

The addition of water 21 and K-mag crystallisation filtrate 28 is controlled to ensure $K_2SO_4$ and $MgSO_4$ are at or near saturation at or near the boiling point of the solution. A water leach slurry 22 is passed through a solid liquid separation stage 130, for example a centrifuge, generating a potassium and magnesium solution 23 and a leached calcine 24. Part of the K and Mg solution 23 can be used to wash the solids in the $FeK(SO_4)_2$ filter 70 and the remainder is fed to a conventional crystalliser 140 in which $K_2SO_4$ is selectively crystallised. A $K_2SO_4$ product 25 is separated from a $K_2SO_4$ crystallisation filtrate 26 and dried prior to sale.

Potassium and magnesium, present in the $K_2SO_4$ crystallisation filtrate, are co-crystallised in a conventional crystalliser 150. A K-mag product 27 is separated from the K-mag crystallisation filtrate 28 and dried prior to sale. The K-mag crystallisation filtrate 28 is recycled to the quench leach 120 to recover more potassium and magnesium.

The solids from the calcine leach filter 130, a leached calcine 24, can be washed with water to remove entrained potassium and magnesium solution and then fed to a calcine acid leach 160 to dissolve phosphate. Sulfuric acid 29 is added. A resulting acid leached calcine slurry 30 is passed through a solid liquid separation stage 170, such as a belt filter, generating a phosphate liquor 32 and $Fe_3O_4$ product 31, which can be washed with water to remove entrained phosphate liquor and stockpiled for sale.

Phosphate can be recovered from the phosphate leach liquor 32 by the addition of a basic compound, for example limestone 32, lime or apatite concentrate, in precipitation tanks 180. The phosphate slurry is passed through a solid liquid separation stage 190, such as a belt filter, and phosphate containing solids 35 are collected and dried prior to sale. The resulting precipitate is generally similar in composition to commercial grade Single Superphosphate (N 0%, P 8.8%, K 0%, S 11%, and Ca 19%). A phosphate precipitation filtrate 36 is recycled to the calcine acid leach 160 to recover more phosphate.

Modifications and variations such as would be apparent to the skilled addressee are considered to fall within the scope of the present invention.

The invention claimed is:

1. A method for the processing of potassium containing materials, the method comprising the steps of:
   (i) passing a potassium containing material to a first separation step in which a potassium containing mineral is separated from gangue minerals present;
   (ii) leaching the potassium containing mineral in acid in a leach step whereby substantially all potassium, iron, aluminium and magnesium present is solubilised and a mixed potassium/iron double salt formed;
   (iii) selectively crystallising the mixed potassium/iron double salt formed in the leach of step (ii) in a crystallisation step;
   (iv) passing a liquor from the crystallising step (iii) to a second separation step to separate the mixed potassium/iron double salt formed in step (iii);
   (v) passing the double salt to a thermal decomposition step to produce an iron oxide, a potassium salt and one or more phosphates;
   (vi) leaching the product of the thermal decomposition step;
   (vii) passing a leach liquor from step (vi) to a third separation step to separate the iron oxide and phosphates from the potassium salt;
   (viii) recovering the potassium salt by crystallisation;
   (ix) separating the iron oxide and phosphate of step (vii) by leaching and subsequent solid liquid separation; and
   (x) precipitating phosphate from a liquor produced in step (ix) through the addition of a base thereto.

2. The method according to claim 1, wherein the potassium containing mineral comprises one or more of glauconite, biotite and/or phlogopite.

3. The method according to claim 1, wherein the iron oxide separated in step (ix) is in the form of one or more of $Fe_3O_4$, $Fe_2O_3$ or FeO.

4. The method according to claim 1, wherein the leaching step (ii) is conducted under atmospheric conditions at a temperature close to boiling.

5. The method according to claim 1, wherein the leaching step is carried out with an excess of sulfuric acid allowing for a free acid concentration of >50 g/L $H_2SO_4$.

6. The method according to claim 5, wherein the total sulfate concentration is such that it is close to the saturation limit of the solution at the leaching temperature.

7. The method according to claim 5, wherein the total sulfate concentration is 6.0M S at >90° C.

8. The method according to claim 1, wherein the retention time is between about 2 to 12 hours.

9. The method according to claim 1, wherein a metal extraction of greater than 70% is achieved during the leaching step (ii).

10. The method according to claim 1, wherein the separation of leach liquor from leached solids is conducted at or near the leach temperature to prevent the crystallisation of metal salts on cooling.

11. The method according to claim 1, wherein the selective crystallisation step (iii) is conducted at or close to the leaching temperature and forced by increasing the sulphur concentration to above saturation.

12. The method according to claim 11, wherein the sulphur concentration is >6M sulphur at >90° C.

13. The method according to claim 12, wherein the increased sulphur concentration is achieved by the addition of concentrated sulfuric acid and/or evaporation.

14. The method according to claim 1, wherein $KFe(SO_4)_2$, $MgSO_4$ and phosphate salts are crystallised in the crystallisation step (iii), the $KFe(SO_4)_2$ being washed to remove entrained impurities with a saturated solution of one or more of $K_2SO_4$, K and Mg sulfates, $K_2SO_4/Fe_2(SO_4)_3$, $H_2SO_4$ and water.

15. The method according to claim 14, wherein the wash solution is recycled to the $KFe(SO_4)_2$ crystallisation stage.

16. The method according to claim 14, wherein a wash filtrate is recycled to the $KFe(SO_4)_2$ crystallisation stage to increase the K/Fe ratio in the liquor.

17. The method according to claim 14, wherein the crystallisation step (iii) is achieved by forced cooling of the mixed $KFe(SO_4)_2$, $MgSO_4$ and phosphate crystallisation filtrate to between about 20 to 60° C.

18. The method according to claim 1, wherein the thermal decomposition step (v) is operated at about 500-700° C., thereby substantially preventing the conversion, if present, of $MgSO_4$ to MgO.

19. The method according to claim 18, wherein a decomposition product is quenched with water to dissolve $K_2SO_4$ and $MgSO_4$, the amount of water being sufficient to ensure $K_2SO_4$ and $MgSO_4$ are close to saturation at a temperature close to boiling.

20. The method according to claim 19, wherein after a solid liquid separation, the crystallisation of $K_2SO_4$ and/or mixed potassium and magnesium double salts from solution is achieved by a combination of cooling and forced evaporation, the conditions being controlled to crystallise $K_2SO_4$ selectively in a primary crystallisation stage and a mixed potassium and magnesium double salt is crystallised from the primary crystallisation filtrate in a secondary crystallisation stage.

21. The method according to claim 1, wherein the precipitation step (x) is forced by the addition of apatite, recovered from greensand, thereby producing a precipitate containing a high concentration of phosphorus.

* * * * *